United States Patent
Girdhar et al.

(10) Patent No.: US 10,117,101 B2
(45) Date of Patent: Oct. 30, 2018

(54) GEOGRAPHICALLY BASED ACCESS MANAGEMENT FOR INTERNET OF THINGS DEVICE DATA

(71) Applicant: CA, Inc., New York, NY (US)

(72) Inventors: Dhiraj Girdhar, Westborough, MA (US); Kevin Meehan, Northport, NY (US); Brian Christopher Peck, Flower Mound, TX (US); Dhara Shah, Sunnyvale, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/691,153

(22) Filed: Aug. 30, 2017

(65) Prior Publication Data

US 2017/0366977 A1    Dec. 21, 2017

Related U.S. Application Data

(63) Continuation of application No. 15/086,352, filed on Mar. 31, 2016, now Pat. No. 9,781,602.

(51) Int. Cl.
| | |
|---|---|
| *H04W 4/70* | (2018.01) |
| *H04W 12/08* | (2009.01) |
| *H04W 4/021* | (2018.01) |
| *H04L 29/08* | (2006.01) |
| *H04L 29/06* | (2006.01) |

(52) U.S. Cl.
CPC ............ *H04W 12/08* (2013.01); *H04L 67/12* (2013.01); *H04L 67/18* (2013.01); *H04W 4/021* (2013.01); *H04W 4/70* (2018.02); *H04L 63/107* (2013.01)

(58) Field of Classification Search
CPC ..... H04W 4/021; H04W 12/06; H04W 12/08; H04W 4/70
See application file for complete search history.

(56) References Cited

U.S. PATENT DOCUMENTS

| | | | |
|---|---|---|---|
| 7,051,196 B2 | 5/2006 | Angelo et al. | |
| 7,668,960 B2 | 2/2010 | Ansell et al. | |
| 7,792,297 B1 | 9/2010 | Piccionelli et al. | |
| RE42,927 E | 11/2011 | Want et al. | |
| 9,781,602 B1 * | 10/2017 | Girdhar | H04W 4/70 |
| 2012/0284769 A1 | 11/2012 | Dixon et al. | |
| 2015/0163631 A1 | 6/2015 | Quam et al. | |
| 2015/0372832 A1 | 12/2015 | Kortz et al. | |
| 2016/0195602 A1 | 7/2016 | Meadow | |
| 2017/0048252 A1 * | 2/2017 | Straub | H04L 67/10 |

* cited by examiner

*Primary Examiner* — Diane Mizrahi
(74) *Attorney, Agent, or Firm* — Gilliam IP PLLC (57) ABSTRACT

The proliferation of IOT devices has led to an increase in sensitive, cloud-stored data. To provide further protection, IOT device data may be secured by geographically based access controls as a supplement to or in place of traditional password protection. A geographically based access control restricts data accessibility to designated geographical areas. In this manner, a requesting device may not access geo-fence protected IOT device data unless the requesting device is located within a designated geographical area. Geo-fence parameters utilized for creation of a geo-fence policy may be pre-specified or generated based on operating conditions. For example, a user may provide location data, such as an address or geographical coordinate, and a radial distance from the location for which data access is permissible. Additionally, geo-fence parameters can be automatically determined based on criteria such as an IOT device type or data usage characteristics.

20 Claims, 6 Drawing Sheets

GEOGRAPHICALLY BASED ACCESS MANAGEMENT FOR INTERNET OF THINGS DEVICE DATA

BACKGROUND

The disclosure generally relates to the field of data security, and more particularly to geographically restricted data access.

Internet of Things ("IOT") devices are devices or items that are embedded with hardware and/or software which allows the devices to collect and exchange data. Examples of IOT devices include fitness trackers, smart home sensors such as thermostats and security systems, health devices such as blood pressure monitors and blood sugar testers, etc. IOT devices are often used to track or record measurements for analysis by a user or software application. Additionally, some IOT devices include actuation capability, such as locks or light bulbs. IOT devices typically have network connectivity or communicate with a network-connected device to transmit collected data to cloud storage. A user may login to an account associated with IOT devices to view or modify data corresponding to or collected by the IOT devices.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to using geo-fences to control access to IOT device data in illustrative examples. But aspects of this disclosure can be applied to using geo-fences to control access to other types of data such as financial data or login credentials. In other instances, well-known instruction instances, protocols, structures and techniques have not been shown in detail in order not to obfuscate the description.

Terminology

The description below uses the term "geo-fence" to refer to a specified geographical boundary or area. A geo-fence can be determined based on a specified radius around a geographic location or coordinate, determined based on a defined set of geographic boundaries, or determined based on existing pre-specified geographic area such as a city or neighborhood. A geo-fence, as used herein, provides an additional layer of data security by requiring a device to be within the geo-fenced area as a condition of granting data access. The granularity with which a geo-fence is defined may vary. For example, a geo-fence may be defined at a country level, state level, city level, etc.

The description below uses the term "IOT device data" or "IOT data" to refer to data collected by or associated with IOT devices. For example, data captured by a fitness tracker, such as step counts or heart rate readings, is referred to as IOT device data. Additionally, IOT device data may be data that indicates a current state or status of an IOT device. For example, in the case of IOT devices with actuation capability such as a lock or lighting system, the IOT device may store data that indicates whether the lock is locked/unlocked or a light is on/off.

Overview

The proliferation of IOT devices has led to an increase in sensitive, cloud-stored data. IOT devices generate data that is frequently of a personal nature such as protected health information ("PHI") or personally identifiable information ("PII"). To provide further protection, IOT device data may be secured by geographically based access controls as a supplement to or in place of traditional password protection. A geographically based access control ("geo-fence") restricts data accessibility to designated geographical areas. In this manner, a requesting device may not access geo-fence protected IOT device data unless the requesting device is located within a designated geographical area. Geo-fence parameters utilized for creation of a geo-fence policy may be pre-specified or generated based on operating conditions. For example, a user may provide location data, such as an address or geographical coordinate, and a radial distance from the location for which data access is permissible. Additionally, geo-fence parameters can be automatically determined based on criteria such as an IOT device type or data usage characteristics.

Example Illustrations

Figure 1:
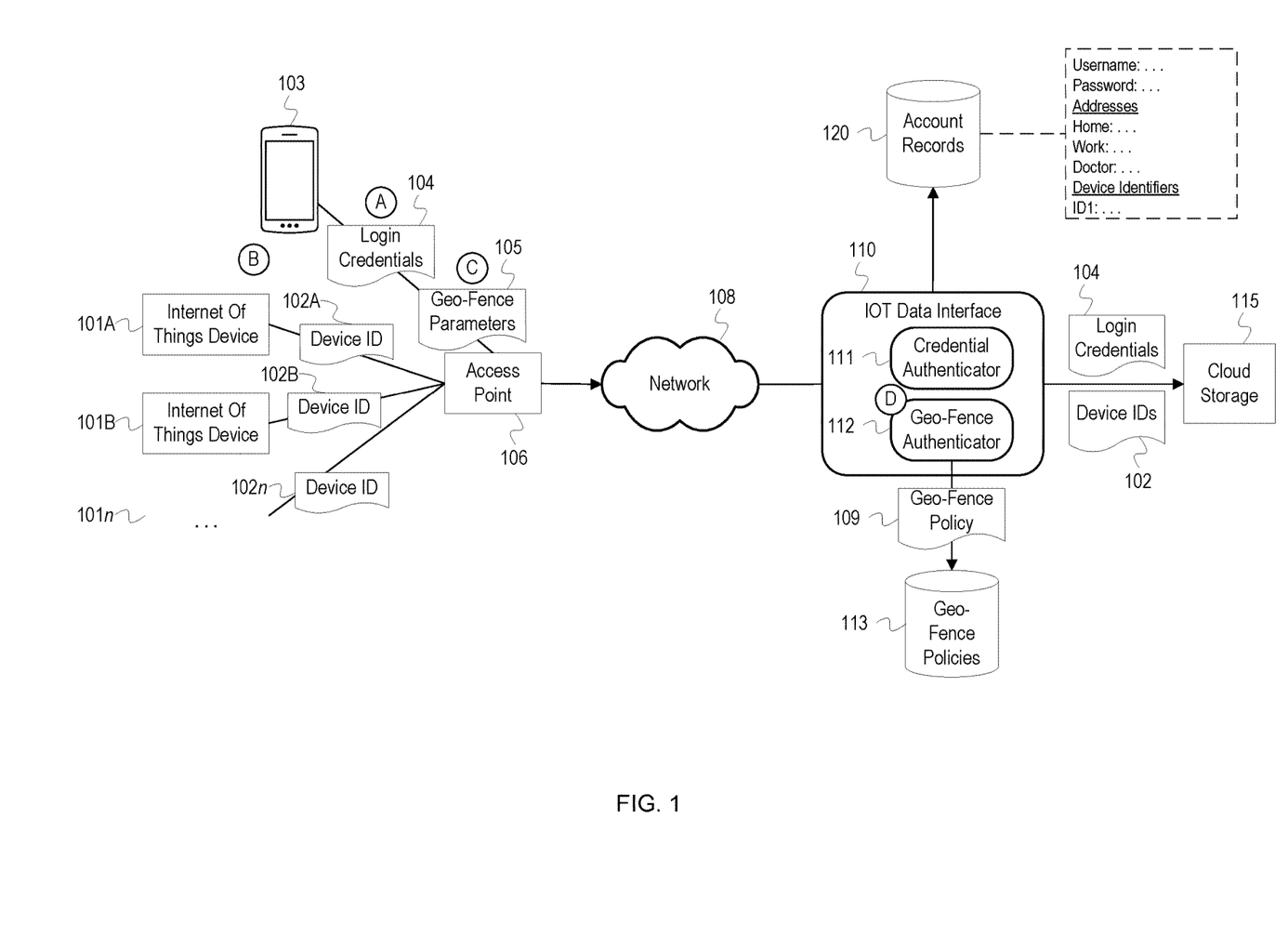
FIG. 1 depicts an example system for configuring geographically-based access management for IOT device data.

FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 1 depicts an example system for configuring geographically-based access management for IOT device data. FIG. 1 includes a user device 103, an access point 106, an IOT data interface 110, a geo-fence policy database 113, cloud storage 115, and account records 120. FIG. 1 also includes a number of IOT devices 101A through 101n ("IOT devices 101"). The user device 103 and the IOT devices 101 are communicatively coupled to the access point 106 which is connected to the network 108. The user device 103 and the IOT devices 101 communicate with the IOT data interface 110 and the cloud storage 115 through the network 108. The IOT data interface 110 includes a credential authenticator 111 and a geo-fence authenticator 112. The geo-fence authenticator 112 is communicatively coupled to the geo-fence policy database 113 ("policy database 113"). The interface 110 is communicatively coupled to the account records 120.

The user device 103 may be any type of computing device such as a smart phone, desktop computer, laptop, etc. The user device 103 may run an application that is used to interface with and view data generated by the IOT devices 101. The IOT devices 101 may be a variety of types/categories of IOT devices such as network-connected heart rate or blood pressure monitors, fitness trackers, smart home devices such as thermostats, etc. The IOT devices 101 may be wirelessly or physically connected to the access point 106. The IOT devices 101 may use this connection to transmit collected data to the cloud storage 115 through the network 108. Alternatively, the IOT devices 101 may leverage the user device's 103 connection to the access point 106. For example, the IOT devices 101 may connect to the user device 103 through a short-wavelength radio wave protocol to transfer data to the user device 103. The user device 103, which is wirelessly or directly connected to the access point 106, may then transmit the data to the cloud storage 115 through the network 108. The cloud storage 115 may be one or more remotely located storage devices accessible through the network 108. Although referred to as "cloud" storage, the cloud storage 115 may be a storage device connected in a local area network. The network 108 may be a local area network or a wide area network such as the Internet. The access point 106 may be a router with/without wireless capability, a cellular tower that provides Internet access to the user device 103, a hub that communicates with the IOT devices 101 using various protocols, etc.

FIG. 1 illustrates a process for establishing an account via the user device 103 for association with the IOT devices 101. The account is associated with data generated by the IOT devices 101 to allow and secure access to the data. The IOT data interface 110 manages access to IOT data in the cloud storage 115. The IOT data interface 110 may be program code executing on a host or server or, although depicted as separate, may be a component of the cloud storage 115.

At stage A, the user device 103 transmits login credentials 104 to the IOT data interface 110 to establish an account for accessing IOT data in the cloud storage 115. The login credentials 104 may be a username and password input by a user via the user device 103 or generated by an application executing on the user device 103. In some implementations, the login credentials 104 may be an identifier for the user device 103, such as a media access control (MAC) address or an Internet Protocol (IP) address. The credential authenticator 111 of the IOT data interface 110 may validate the login credentials 104 prior to storing the login credentials 104 in the account records 120. For example, the credential authenticator 111 may ensure that a username or password is a specified number of characters or of sufficient complexity. In addition to credentials, the user may provide additional account information such as a home or work address. The user device 103 may communicate with the IOT data interface 110 using various communication protocols such as Hypertext Transfer Protocol (HTTP), Secure HTTP (HTTPS), REST protocols, Simple Object Access Protocol (SOAP), or an application programming interface (API) of the IOT data interface 110.

At stage B, the IOT devices 101 transmit device identifiers 102A through 102*n* ("device identifiers 102") to the IOT data interface 110 which associates the device IDs with the account in one or more account records. The device identifiers 102 are identifiers for the IOT devices 101 such as MAC addresses, IP addresses, globally unique identifiers ("GUID"), device names, etc. The IOT devices 101 may transmit the device identifiers 102 in response to a command from the user device 103. Alternatively, the IOT devices 101 may transmit the device identifiers 102 to the user device 103 during a configuration process, and the user device 103 may transmit the device identifiers 102 for association with the account established at stage A. Associating the IOT devices 101 with the account allows for data generated by the IOT devices 101 to be accessed and secured via corresponding account records. The IOT data interface 110 associates the IOT devices 101 with the account by storing the login credentials 104 (or a portion thereof, such as a username) with the device identifiers 102 in the account records 120.

At stage C, the user device 103 transmits geo-fence parameters 105 to the IOT data interface 110. The geo-fence parameters 105 describe geographical restrictions to be satisfied before access is granted to data in the cloud storage 115. In this manner, a device attempting to access the data must be located within a specified geographical area to be granted access. The geo-fence parameters 105 may be expressed in a variety of ways such as a distinct location (street address, geographical coordinates) paired with a radial distance (such as 50 miles or kilometers), a geographical region such as a city or country, a geographical boundary or shape define by multiple geographical coordinates, etc. The geo-fence parameters 105 may be established by a user of the user device 103 or may be auto-generated by an application executing on the user device 103. For example, the geo-fence parameters 105 may be an address and a radial distance input by a user. Alternatively, the user device 103 may determine a location of the user device 103 and use a pre-configured radial distance. For example, the user device 103 may use a global positioning system (GPS) component, may use cellular-tower triangulation, or may use a location provided by the access point 106 to determine the user device's 103 location at the time of establishing the geofence parameters 105. After determining the location, the user device 103 may include the geographical coordinates of the user device 103 together with a pre-configured radial distance in the geo-fence parameters 105.

The geo-fence parameters 105 may describe more than one geographical area to allow for data access from multiple locations. For example, a user may input multiple addresses (such as a home, work, or vacation address) to allow access to data from the multiple addresses. Additionally, a user may wish to grant access to another user in a different location and may describe geographical restrictions for the other user.

Also, geographical areas described in the geo-fence parameters 105 may be associated with a single device of the IOT devices 101 or a group of one or more of the IOT devices 101. For example, a user may define a geographical area in the geo-fence parameters 105 that applies to the IOT device 101A and a different geographical area that applies to the IOT device 101B. Or, the geo-fence parameters 105 may apply to a specified group of the IOT devices 101. For example, a user may define a geographical area that applies to the IOT device 101A and the IOT device 101B as a group. The geo-fence parameters 105 may associate geographical areas with the IOT devices 101 using the device identifiers 102. For example, the geo-fence parameters 105 may indicate a geographical area associated with the device identifier 102A and geographical area associated with the device identifier 102B. Additionally, the geo-fence parameters 105 may apply to a set of IOT devices defined based on an IOT device type. For example, medical IOT device types, such as weight scales, blood pressure monitors, etc., may be one grouping of the IOT devices 101. The geo-fence parameters 105 may also be adjusted based on one or more IOT device types. For example, data from smart home IOT device types, such as thermostats, door locks, etc., may be accessed primarily within a limited geographical area such as a home, whereas data from fitness tracker IOT device types may be accessed within a broader geographical area such as a running trail or gym. As a result, fitness tracker device types may be associated with a larger radial distance in the geo-fence parameters 105 than smart home device types.

Furthermore, geographical areas described in the geo-fence parameters 105 may be associated with a time period or time window. For example, a geographical area for a work address may be defined as active from 9:00-5:00. Therefore, if the user device 103 requests access to data outside of 9:00-5:00, the access request will be denied even if the user device 103 is located in the geographical area described by the work address. Similarly, an access-granting geographical area may expire after a time period. For example, a geographical area may be configured to grant access for a two hour time period before expiring. As an additional time-based restriction, the geo-fence parameters 105 may specify that a device must be located within a specified geographical area for a minimum period of time prior to granting access. For example, a minimum time period of thirty minutes may be associated with a geographical area, so the user device 103 will not be granted access until it has been located within the geographical area for more than thirty minutes. Such a time restriction may prevent unauthorized access by guests temporarily visiting a geographic area, such as a user's home, or by malevolent users attempting to discern a defined geographical area to gain unauthorized access.

After determining or receiving the geo-fence parameters 105, the user device 103 transmits the geo-fence parameters 105 to the IOT data interface 110. At stage D, the geo-fence authenticator 112 generates a geo-fence policy 109 based on the geo-fence parameters 105. The geo-fence authenticator 112 manages geo-fence policies in the policy database 113 so that the geo-fence authenticator 112 can later verify that a device attempting to access data in the cloud storage 115 complies with a policy in the policy database 113. As part of generating the geo-fence policy 109, the geo-fence authenticator 112 may convert, transform, or augment data in the geo-fence parameters 105. For example, if a geographical area is described by an address and a radial distance, the geo-fence authenticator 112 may transform the address to a geographical coordinate and may identify geographical coordinates for boundaries indicated by the radial distance. Alternatively, the geo-fence authenticator 112 may use the address and the radial distance to compute a circular boundary defined by the center point (i.e., the address) and radial distance. An equation for computing the boundary may be included in the geo-fence policy 109 and may be used to more quickly authenticate a device's geographic location. The geo-fence authenticator 112 may also validate the geo-fence parameters 105. For example, the geo-fence authenticator 112 may determine that an address does not exist and may indicate the error to the user device 103. As an additional example, the geo-fence authenticator 112 may determine that a radial distance is below a minimum required radial distance. The minimum required radial distance may be a preconfigured value or may be a value that is determined based on the location-determining capabilities of the user device 103. For example, if the user device 103 is equipped with a GPS system, the minimum radial distance may be smaller given the accuracy and granularity with which a GPS system can determine a location. However, if the user device 103 is using cellular-tower triangulation or if a location is based off the access point 106 or an Internet service provider's (ISP) indicated location, the minimum radial distance may be larger given the decrease in accuracy and lack of granularity with which the location is indicated.

The geo-fence authenticator 112 may associate the geo-fence policy 109 with a username or other credential from the login credentials 104, thereby enabling the geo-fence authenticator 112 to retrieve the geo-fence policy 109 from the policy database 113 using the credential. Also, the geo-fence authenticator 112 may associate the geo-fence policy 109 with one or more of the device identifiers 102, thereby enabling the geo-fence policy 109 to be retrieved using one of the device identifiers 102. In instances where the geo-fence parameters 105 indicate multiple geographic areas, the geo-fence authenticator 112 associates geographic areas with those of the device identifiers 102 to which a geographic area applies. In such instances, the geo-fence authenticator 112 may use one of the device identifiers 102 to retrieve the portion of the geo-fence policy 109 which relates to data attempting to be accessed.

FIG. 1 describes the geo-fence parameters 105 being determined at the user device 103. However, in some implementations, the geo-fence authenticator 112 may determine the geo-fence parameters 105 based on a location of the user device 103 at the time of establishing the account and configured values. For example, the geo-fence authenticator 112 may be configured with a default radial distance value or may adjust the radial distance value based on the type of the user device 103 or the type of the IOT device being configured. In some implementations, the user device 103 may display or otherwise present during the configuration process questions related to planned usage for an IOT device and IOT device data. For example, the user device 103 may present questions related to whether the user plans to travel internationally with the device, plans to use the device at home or work, etc. The geo-fence authenticator 112 may determine a geo-fence policy based on responses to these questions. Alternatively, the geo-fence authenticator 112 may infer planned usage or usage characteristics based on an IOT device type. In some implementations, the policy database 113 may include a catalog of preconfigured policies that the geo-fence authenticator 112 can select from based on planned usage, IOT device type, data type, etc. For example, the geo-fence authenticator 112 may determine that the IOT devices 101 are medical devices and may select a policy designed to protect PHI. The preconfigured policies may be provisionally modified on a user-by-user basis using information associated with a user's account. For example, the preconfigured policy for medical devices may be modified with addresses from the user's account information such as a home address and an address for the user's doctor. The geo-fence authenticator 112 determines data access areas based on these addresses and the parameters in the preconfigured policy.

Figure 2:
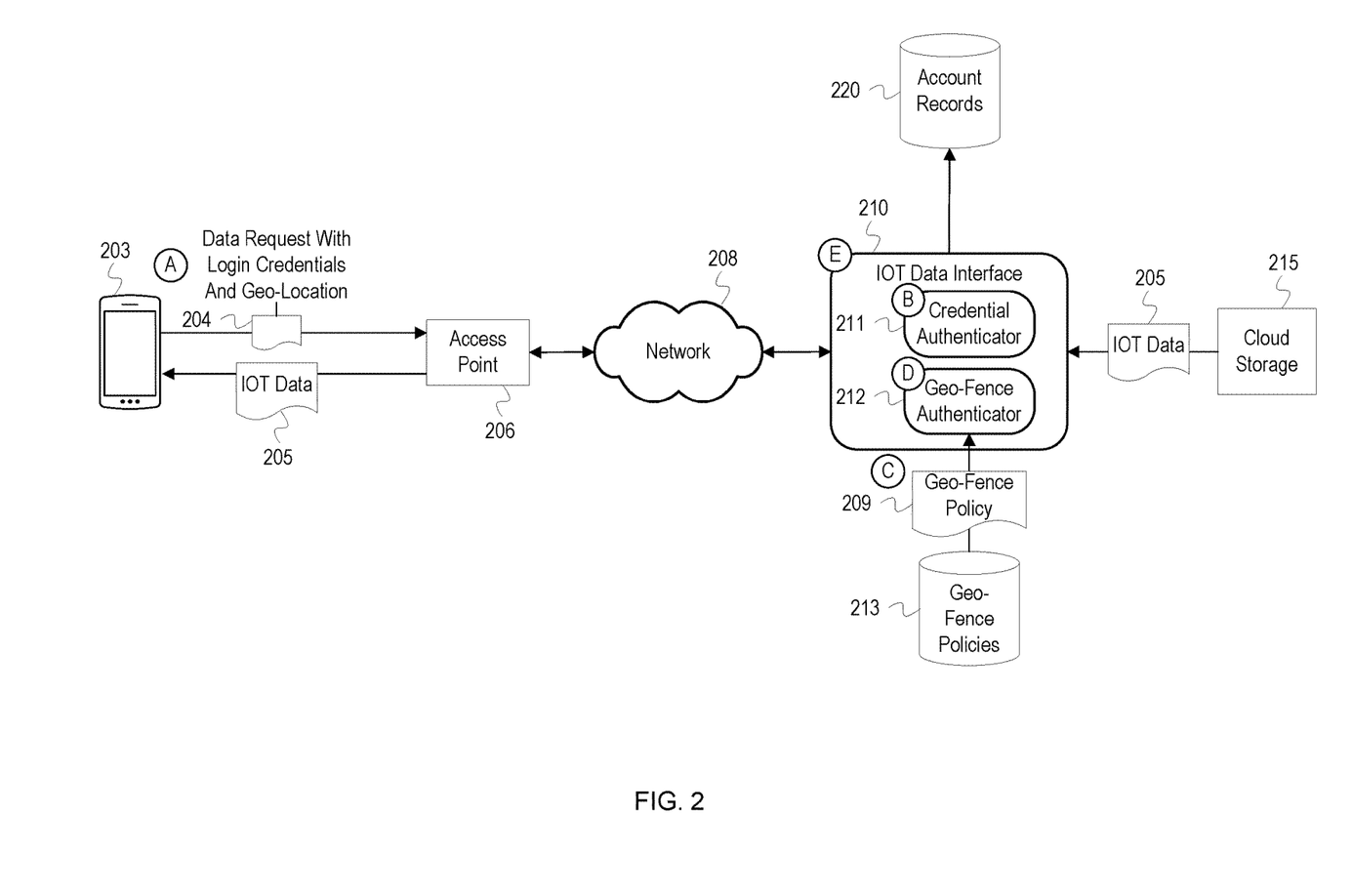
FIG. 2 depicts an example system for retrieving IOT device data protected by a geo-fence policy.

FIG. 2 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 2 depicts an example system for retrieving IOT device data protected by a geo-fence policy. FIG. 2 includes a user device 203, an access point 206, an IOT data interface 210, a geo-fence policy database 213, cloud storage 215, and account records 220. The user device 203 is communicatively coupled to an access point 206 that is connected to the network 208. The user device 203 communicates with the IOT data interface 210 and the cloud storage 215 through the network 208. The IOT data interface 210 includes a credential authenticator 211 and a geo-fence authenticator 212. The geo-fence authenticator 212 is communicatively coupled to the geo-fence policy database 213 ("policy database 213"). The interface 210 is communicatively coupled to the account records 220.

The cloud storage 215 includes data generated by IOT devices (not depicted). For example, the cloud storage 215 may include measurements collected by IOT devices such as blood pressure readings, weight, number of steps walked, etc. As another example, the cloud storage 215 may include measurements collected by smart home IOT devices that may include timestamps for when a user arrived/departed a residence, a current state of IOT devices in a home such as whether a lock is locked or unlocked, etc. The IOT data in the cloud storage 215 is protected by a geo-fence policy 209 similar to the geo-fence policy 109 described in FIG. 1.

At stage A, the user device 203 sends a data request 204 that includes login credentials and a geo-location of the user device 203 to the IOT data interface 210. The data request 204 may be generated by an application executing on the user device 203. The login credentials may be login credentials such as those configured at stage A of FIG. 1. The geo-location may be determined by the user device 203 or may be based on location data transmitted by or requested from the access point 206. The data request 204 may identify data to retrieve based on an IOT device type/identifier, a data type, a username or other account identifier, etc. For example, the data request 204 may include an IOT device identifier to retrieve data generated by a corresponding device. As additional examples, the data request 204 may include the username or other identifier for the account to retrieve data associated with the account, or the data request 204 may identify a particular type of data such as health and fitness data. The data request 204 may also specify a time period from which to retrieve data or may include a query for filtering data, such as "retrieve all dates with more than 10,000 steps from fitness tracker data."

At stage B, the credential authenticator 211 authenticates the login credentials received with the data request 204. The credential authenticator 211 may use a variety of authentication schemes such as the Initiative for Open Authentication ("OATH"), OpenID, a Kerberos authentication scheme, Java Authentication and Authorization Service ("JAAS"), etc. The credential authenticator 211 retrieves stored credentials associated with the account from the account records 220. The credential authenticator 211 then authenticates the credentials received with the data request 204 against the stored credentials. If the credentials match, the credential authenticator 211 determines that the user device 203 is authenticated, and the credential authenticator 211 indicates a successful authentication to the IOT data interface 210.

At stage C, the geo-fence authenticator 212 retrieves the geo-fence policy 209 from the policy database 213. The geo-fence authenticator 212 may query or search the policy database 213 using a username or other credential received with the data request 204 or an IOT device identifier provided in the data request 204. In some instances, an account may have multiple geo-fence policies in the policy database 213. In such instances, the geo-fence authenticator 212 may retrieve the policies and identify the applicable policy based on a type of data being requested, IOT device type/identifier, or the geo-location indicated in the data request 204. For example, a geo-fence policy may be based on a particular location (such as a user's work address), so the geo-fence authenticator 212 selects the policy as the applicable policy if the geo-location in the data request 204 indicates the user device 203 is located at the particular location.

At stage D, the geo-fence authenticator 212 authenticates the geo-location of the user device 203 based on the geo-fence policy 209. The geo-fence authenticator 212 determines whether the geo-location of the user device 203 received with the data request 204 falls within any of the data access areas described in the geo-fence policy 209. For example, the geo-fence authenticator 212 may determine whether the location is within boundaries indicated by geographical coordinates by determining whether the latitude and longitude of the location are between the latitudes and longitudes of the geographical boundaries. As described above, the geo-fence policy 209 may include an equation or set of equations that describe the geographical boundaries. The geo-fence authenticator 212 may evaluate the geo-location against the equations to determine whether the geo-location is within any of the geographical boundaries. The geo-fence authenticator 212 also determines whether other parameters in the geo-fence policy 209, such as time-based parameters, are satisfied by the user device 203 or the data request 204. For example, the geo-fence authenticator 212 may determine whether the data request 204 was received or submitted within a time window indicated in the geo-fence policy 209. In some implementations, the geo-location may not be received with the data request 204. Instead, the geo-fence authenticator 212 may request the geo-location from the user device 203 or may determine a location of the user device 203 based on the access point 206. After determining that the geo-location satisfies the geo-fence policy 209, the geo-fence authenticator 212 indicates a successful authentication to the IOT data interface 210.

After the credentials and the geo-location are successfully authenticated, the IOT data interface 210, at stage E, retrieves IOT data 205 from the cloud storage 215 and provides the IOT data 205 to the user device 203. The IOT data interface 210 may retrieve the IOT data 205 from the cloud storage 215 based on parameters or a query described in the data request 204. The IOT data interface 210 may convert or translate the parameters in the data request 204 to be compatible with a protocol or API of the cloud storage 215, such as structured query languages (SQL), Java persistence query languages (JPQL), etc. The IOT data interface 210 may also convert or translate the IOT data 205 to be in a format compatible with the user device 203. For example, the IOT data interface 210 may convert the IOT data 205 into delimited data, may remove extraneous data, or may compress the data for transmission. After receiving the IOT data 205, the user device 203 may format and display the IOT data 205 to a user or may provide the IOT data 205 to an application executing on the user device 203.

FIG. 2 depicts the data request 204 as originating from the user device 203. However, in some implementations, the data request 204 may originate from or be triggered by an IOT device or the IOT data interface 210. IOT devices may collect data that requires attention from a user or may collect data for which a user has requested periodic updates. In such instances, the IOT device may send a push request to the IOT data interface 210 instructing the IOT data interface 210 to push a notification or particular data to a user. The IOT data interface 210 or the geo-fence authenticator 212 may monitor a user's location and push the data to the user device 203 once the user device 203 has entered a geographical area described in the geo-fence policy 209 or in another policy applicable to the IOT device that generated the push request.

In some implementations, the IOT data 205, or a portion thereof, may be exempted from the geo-fence policy 209 or any other geographically-based access restrictions. For example, if the IOT data 205 is related to a home-security monitoring device, the IOT data 205 may be exempted as home security alerts could be of critical importance. The policy database 213 may identify exempted data by a data type, a severity or importance indicator included in the data, or based on an IOT device type which generated the data. For example, a home security device may generate data with varying levels of severity or importance, and the IOT data interface 210 may exempt data with a high severity level from geo-location authentication. The geo-fence policy 209 or geographical areas described in the geo-fence policy 209 may be associated with a threshold importance indicator which indicates that the geo-fence policy 209 does not apply to data associated with an importance indicator greater than the threshold. The policy database 213 may maintain a separate policy or a list which includes identifiers or descriptors for exempted data. When supplying the IOT data 205, the IOT data interface 210 may send the exempted portions of the IOT data 205 if the location of the user device 203 does not satisfy the geo-fence policy 209.

Figure 3:
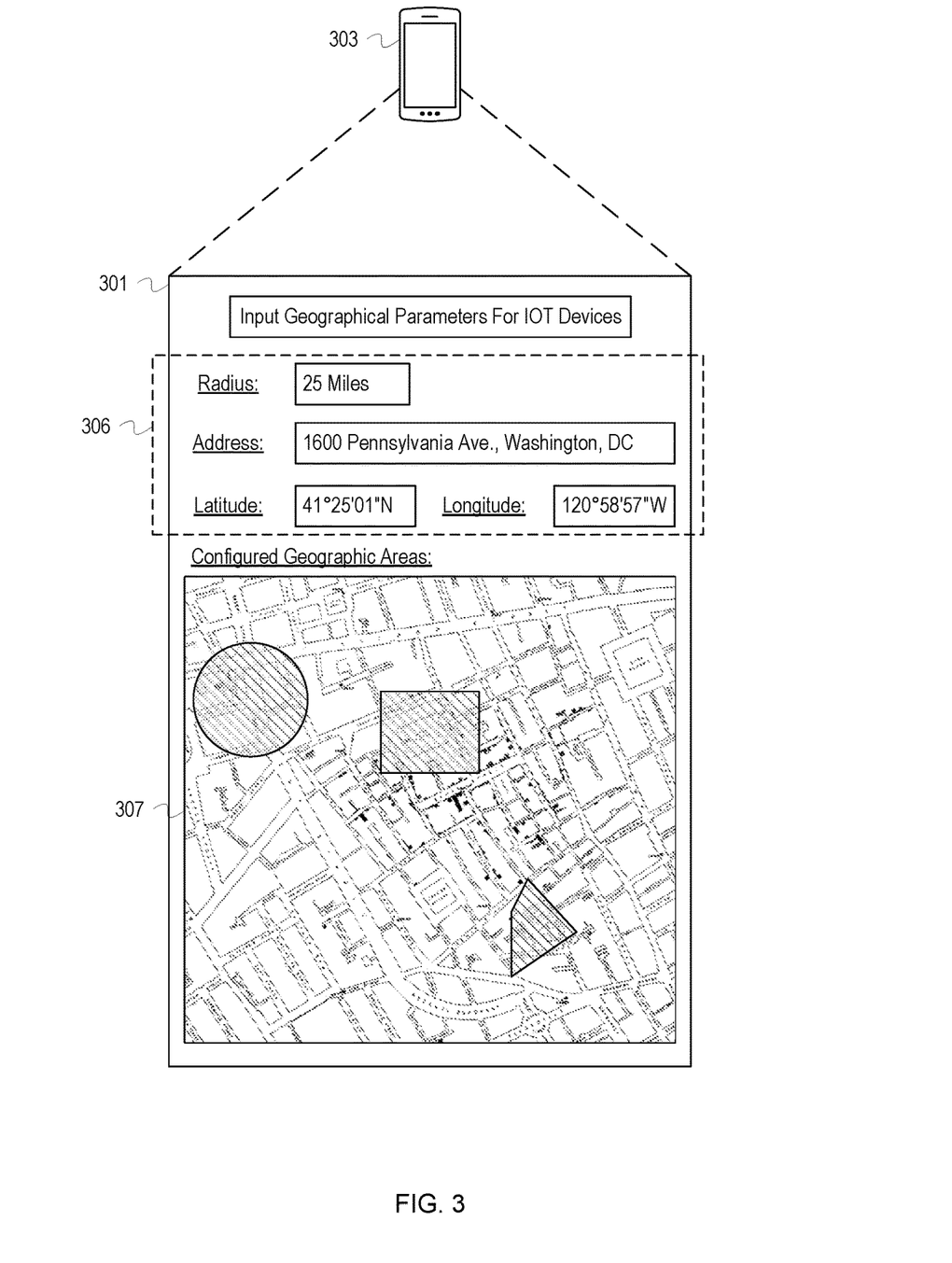
FIG. 3 depicts an example user interface for defining a set of geographical areas for IOT data access control.

FIG. 3 depicts an example user interface for defining a set of geographical areas for IOT data access control. FIG. 3 depicts a user device 303 that displays a user interface 301. The user interface 301 includes inputs 306 and map display 307.

The user interface 301 allows a user to input geographical parameters for defining a geographical area from which data access is permissible. The user interface 301 may be a portion of an application for interfacing with IOT devices and viewing IOT device data that is executing on the user device 303. A user may use the inputs 306 to input the geographical parameters such as a radius or radial distance, an address, or a latitude and longitude. The inputs 306 may also include fields for associating a time period, time window, or other time-based restriction with a geographical area.

The map display 307 shows geographical areas that have been configured by a user or determined by an IOT data interface. The configured geographical areas are depicted by the shaded shapes in the map display 307. The map display 307 may also depict additional parameters associated with the geographical areas. Furthermore, the map display 307 may allow a user to select and edit a configured geographical area, modify a configured geographical area by transforming or adjusting the boundaries, or draw or trace a new geographical area.

Figure 4:
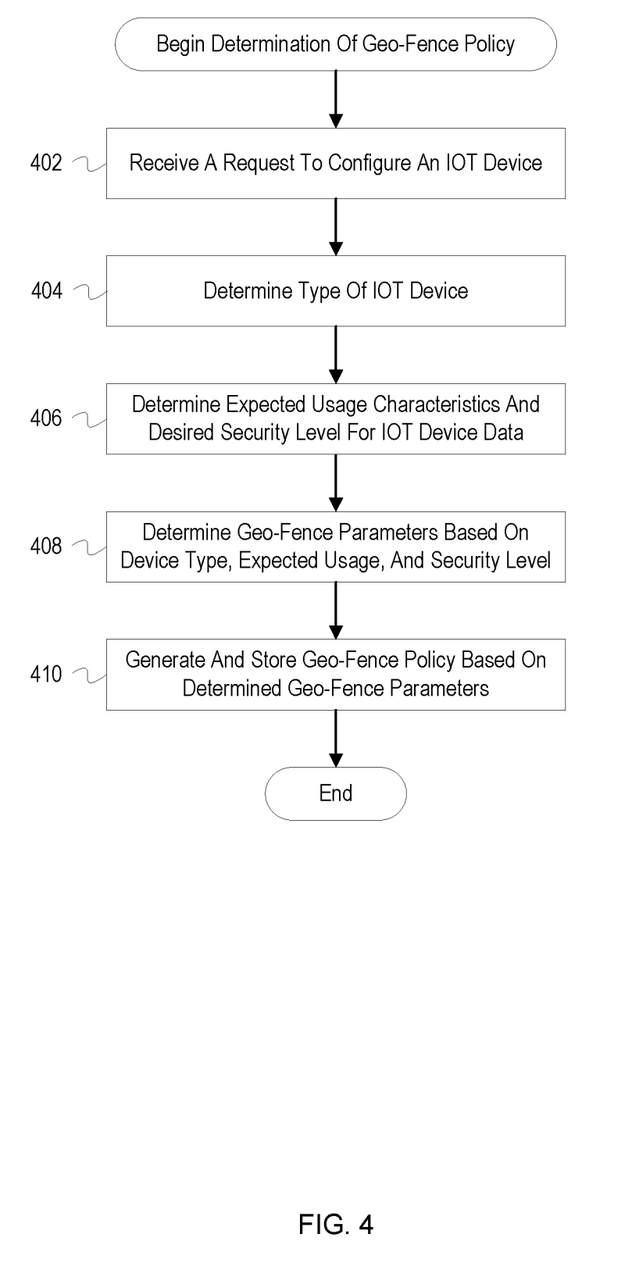
FIG. 4 depicts a flow diagram with example operations for determining a geo-fence policy.

FIG. 4 depicts a flow diagram with example operations for determining a geo-fence policy. FIG. 4 refers to an IOT data interface as performing the operations for naming consistency with FIGS. 1 and 2 even though identification of program code can vary by developer, language, platform, etc.

An IOT data interface ("interface") receives a request to configure an IOT device (402). The interface may receive the request from a user device or application associated with the user device. The request may include account credentials for a user configuring the device, a device identifier, geographic parameters, etc. Additionally, the request may specify identifiers for a number of IOT devices to be configured. In some instances, the interface may receive a request to implement geographic restrictions for an IOT device(s) that has been previously configured. The operations described below are performed similarly for either a newly or previously configured device or devices. As part of the configuration process, the interface may associate an identifier for an IOT device specified by the request with a user account and may create a database table or other log for storing data generated by the IOT device in cloud storage. Additionally, the interface determines a geo-fence policy to protect the IOT device data as described in the operations below.

The interface determines a type of the IOT device (404). The IOT device type or category may, in part, determine which geographic parameters are selected for the geo-fence policy. For example, a medical-type IOT device may require stricter parameters for increased security than a thermostat device. Additionally, data for some device types is typically viewed at a particular location. For example, data related to a smart home device may be viewed primarily at a residence while data for a fitness tracker may be viewed at a residence and another area outside of the residence such as a gym. The interface may determine the device type from information in the request received at block 402, such as a device identifier or other device properties (serial number, brand, model number, etc.). The interface may query a database that includes device information (e.g., device type) using the device properties.

The interface determines expected usage characteristics and a desired security level for data generated by the IOT device (406). The interface may determine planned or expected use of an IOT device and IOT device data based on typical usage patterns for the IOT device type or based on prior use by a user. For example, the interface may determine a primary location(s) to that data for an IOT device may be used or viewed. The interface may determine addresses or other geographic identifiers such as cities or zip codes to identify primary use locations from a user's account records, or the interface may infer a location based on the current location of the user's device. Additionally, the interface may infer other usage characteristics such as times of the day access to the IOT device data may be requested. The interface may also determine a desired level of security. The security level may, for example, be a number from 1 to 5 or may be an enumerated list of security levels such as public, secret, top secret, etc. The interface may select a security level based on the type of IOT device or a security level indicated in user account records. For example, a medical-type device or home security device may have a security level of 5 while a lighting system may have a security level of 1.

The interface determines geo-fence parameters based on criteria of device type, expected usage, and security level (408). For example, the interface may determine locations and a radial distance to be applied to the locations. The value of the radial distance may be adjusted based on criteria such as the device type, the desired security level, or expected usage characteristics. For example, the radial distance may be shorter for a high security level or longer for a low security level. As an additional example, a radial distance applied to device types like lighting systems or weight scales may be shorter given that those devices are typically used within a confined location. The interface may also determine time windows or periods to be associated with determined geographical areas. For example, if device data will be primarily accessed during work hours, the interface may set a time window of 9:00-5:00.

The interface generates and stores a geo-fence policy based on the determined geo-fence parameters (410). The geo-fence policy may be a data structure or file such as an extensible markup language (XML) file, a JavaScript object notation (JSON) object, etc. The interface may populate the geo-fence policy with the determined parameters and other information such as an identifier for the user's account. Additionally, the interface may convert or transform the parameters into an equation or set of equations that describe the indicated geographical areas and include the equation(s) in the policy. Alternatively, the interface may convert or transform identified locations into latitude and longitude geographical coordinates. In some implementations, the interface may select a geo-fence policy from a catalog of existing policies and modify the policy based on the determined parameters.

Figure 5:
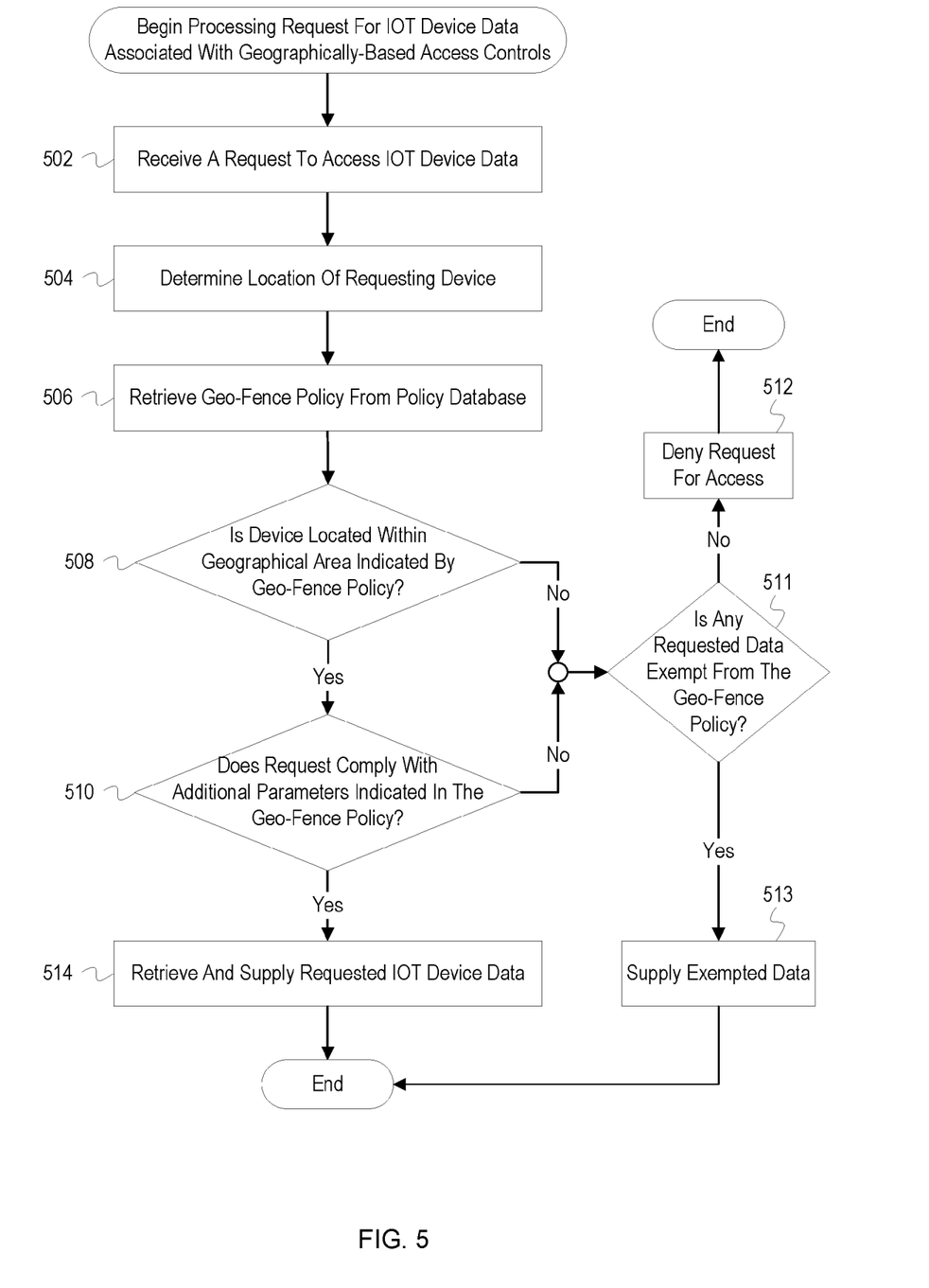
FIG. 5 depicts a flow diagram with example operations for processing a request for IOT device data with geographically-based access controls.

FIG. 5 depicts a flow diagram with example operations for processing a request for IOT device data with geographically-based access controls. FIG. 5 refers to an IOT data interface as performing the operations for naming consistency with FIGS. 1 and 2 even though identification of program code can vary by developer, language, platform, etc.

An IOT data interface ("interface") receives a request to access IOT device data (502). The interface may receive the request from a requesting/user device or application associated with the requesting device. The requesting device may identify the requested data based on a device identifier, an account identifier, a time window, a data type, a device type, or a combination of the foregoing. For example, the device may request heart rate data recorded by a heart rate monitor over a specific date span. The request may also include information such as an identifier for a user account or a session identifier for an established session.

The interface determines a location of the requesting device based on location data included in the request (504). Alternatively, the interface may request the device's location in response to receiving the request or may determine the location based on a wide area network IP address of the device. In some implementations, the interface may record the requesting device's location when a user logs in or establishes a session. In such an implementation, the interface may retrieve the recorded location from the user's account data.

The interface retrieves a geo-fence policy from a policy database (506). The interface may retrieve or select an applicable geo-fence policy by querying the policy database using a username or other identifier for the account, a device identifier, a device type, a data type, or any combination of the foregoing. For example, the interface may query the policy database using a device identifier for a fitness tracker and a data type/category of "steps" to retrieve a geo-fence policy that applies to the step count data of the fitness tracker. To retrieve the applicable policy, the interface may first determine which device or devices generated the requested data. The interface may then retrieve the policy using the identifiers for those device(s). In instances where a geo-fence policy has not been previously generated, the interface may retrieve a policy or a policy template from a catalog of geo-fence policies in the policy database. The catalog may contain preconfigured geo-fence policies for particular device or data types. For example, the catalog may contain a preconfigured geo-fence policy that applies to smart home devices and indicates that data from smart home devices is accessible within a geographical area defined by a ten mile radius around the user's home address. The interface may provisionally modify the preconfigured geo-fence policy and determine the geographical area using the user's home address from the user's account data. In some instances, there may be multiple policies associated with requested data, such as when the request identifies data generated by more than one IOT device. Additionally, the requested data may be associated with a user-created policy and a default pre-configured policy that also applies to the requested data based on a type of the data or type of device that generated the data. In such instances, the interface retrieves each of the applicable policies from the policy database.

The interface determines whether the device is located within a geographical area indicated by the geo-fence policy (508). The interface may determine a geographical coordinate for the device's location and compare the coordinate to geographical coordinates in the geo-fence policy. Additionally, the interface may determine whether the device's location corresponds to an address indicated in the geo-fence policy. Furthermore, the interface may evaluate the device's location against a set of equations that describe geographical areas indicated in the geo-fence policy. In instances where multiple geo-fence policies apply, the interface may evaluate the device's location against geographical areas indicated in each policy. The interface may indicate for each policy whether the device is within an indicated geographical area. In some implementations, the process of determining whether the device is located within a geographical area indicated by the geo-fence policy may be referred to as authenticating the location of the device.

If the interface determines that the device is located within a geographical area indicated by the geo-fence policy, the interface determines whether the device complies with additional parameters indicated in the geo-fence policy (510). The geographical area in which the device is located may be associated with additional parameters in the geofence policy such as time-based parameters or network-based parameters. For example, the geo-fence policy may indicate that data may only be accessed from the geographical area within a time window. As an additional example, the geo-fence policy may indicate that the device must be located within the geographical area for a minimum time period before access is granted. To determine the length of time within a geographical area, the interface may request a location history log from the device or may track the device's location during a user session. The geographical area in the geo-fence policy may also be associated with a parameter that indicates that data may only be accessed from a particular network or networks within the geographical area. The interface may determine the network to which the device is connected based on an IP address of the device or an IP address of an access point to which the device is connected.

If the interface determined at block 508 that the device is not located within a geographical area indicated by the geo-fence policy or if the interface determined at block 510 that the device does not comply with the other parameters indicated in the geo-fence policy, the interface determines whether any of the requested data is exempt from the geo-fence policy (511). The interface may analyze properties or information associated with the requested data to determine whether the requested data is exempt from the geo-fence policy. For example, the requested data, or a portion thereof, may be associated with an importance indicator that indicates importance or severity of the data. Important IOT device data may be data that is associated with certain IOT device types such as health monitoring devices or home security devices. The IOT device may assign an importance indicator to generated data before sending the data to cloud storage. For example, a blood pressure monitoring may assign an importance indicator to collected blood readings that indicate high blood pressure, while low blood pressure readings may not have an importance indicator. If the importance indicator is above a specified level, the interface supplies the requested data associated with the importance indicator. In some implementations, the importance indicator may be a flag or bitwise indicator instead of a set of levels, and the data is considered exempt when the flag is set.

If the requested data, or a portion thereof, is exempt from the geo-fence policy, the interface supplies the exempted data (513). The interface may also indicate that only a portion of the requested data is being supplied or that the exempted data was supplied even though the geo-fence policy was not satisfied. After the interface supplies the exempted data, the process ends.

If no requested data is exempt from the geo-fence policy, the interface denies the request to access the IOT device data (512). The interface may respond to the device with an error message indicating which parameters of the geo-fence policy the device failed to satisfy or may indicate that the request has been denied. After the interface denies the request, the process ends.

If the interface determined at blocks 508 and 510 that the device complies with the geo-fence policy, the interface retrieves the IOT device data from storage and supplies the data to the device (514). Prior to supplying the data the interface may filter or convert the data for use by the requesting device. In instances where multiple geo-fence policies applied to the requested data, the interface removes data corresponding to geo-fence policies that were not satisfied by the device's location or other parameters of the request. For example, the data request may have requested data from three IOT devices with three corresponding geo-fence policies. If the first two policies are satisfied but the third is not, the interface provides the data collected by the first two devices and not the third. After supplying the data, the process ends.

Variations

The examples often refer to an "IOT data interface." The IOT data interface is a construct used to refer to implementation of functionality for authenticating credentials and geo-locations and providing access to data storage. This construct is utilized since numerous implementations are possible. An IOT data interface may be a storage controller, a particular component or components of a machine (e.g., a particular circuit card enclosed in a housing with other circuit cards/boards), machine-executable program or programs (e.g., a database management system), firmware, a circuit card with circuitry configured and programmed with firmware for authenticating credentials and geo-locations, processing data requests, etc. The term is used to efficiently explain content of the disclosure. The IOT data interface can also be referred to as an IOT data manager or IOT data access layer. Although the examples refer to operations being performed by an IOT data interface, different entities can perform different operations. For instance, a dedicated co-processor or application specific integrated circuit can perform authentication of a user's credentials or a device's location.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 404 and 406 of FIG. 4 and blocks 508 and 510 of FIG. 5 can be performed in parallel or concurrently. Additionally, the operations depicted in block 406 of FIG. 4 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The description above describes configuring geographical areas within which data access is granted. Alternatively, in some implementations, a user may specify locations from which access is restricted. In such an implementation, access may be granted from all areas except the restricted areas. For example, a user may specify a specific country or countries from which data may not be accessed. Alternatively, the user may specify the restricted locations to prevent the IOT data interface from automatically determining geo-fence parameters that may include the restricted locations.

Geographic areas may be dynamically adjusted in response to user behavior. For example, a user may begin a session for accessing data within a geographical area and may then travel outside of the area during the session. The IOT data interface may detect this change in location and expand the geographical area to accommodate the user's movement. Similarly, a user may frequently continue a data access session outside of a configured time window. The IOT data interface may adjust the time window in the geo-fence policy based on the extended session.

The variations described above do not encompass all possible variations, implementations, or embodiments of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semi-conductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
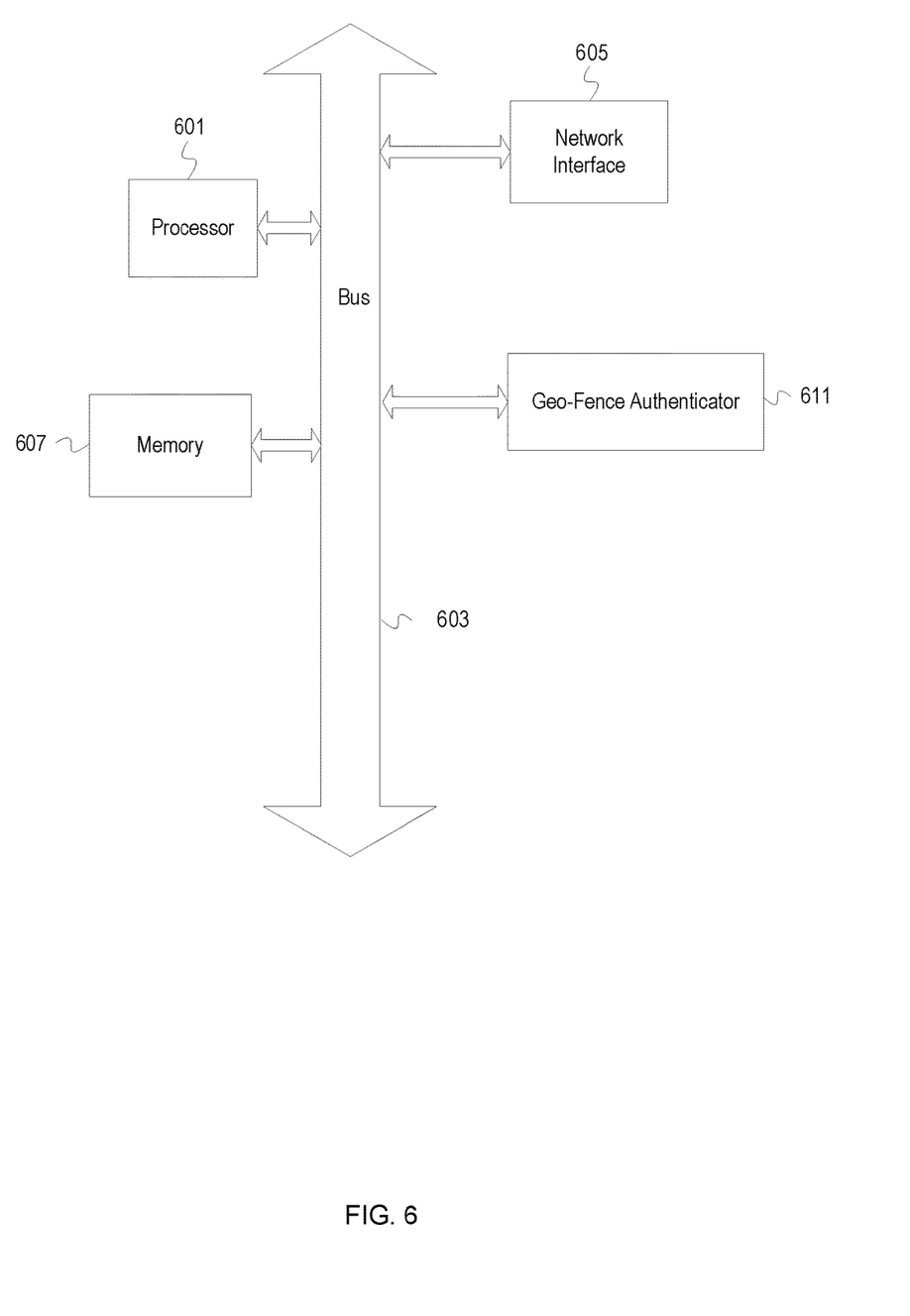
FIG. 6 depicts an example computer system with a geo-fence authenticator.

FIG. 6 depicts an example computer system with a geo-fence authenticator. The computer system includes a processor unit 601 (possibly including multiple processors, multiple cores, multiple nodes, and/or implementing multithreading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes a geo-fence authenticator 611. The geo-fence authenticator 611 authenticates a device's location against a geo-fence policy to determine whether the device is located in a geographical area from which data access is permissible. Any one of the previously described functionalities may be partially (or entirely) implemented in hardware and/or on the processor unit 601. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for securing data with geographically based access control as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
   based on receiving first data from a first measuring device, determining a category of the first data;
   identifying one or more geographical areas based, at least in part, on the category of the first data and a current location of the first measuring device;
   generating an access policy for the first data based, at least in part, on the identified geographical areas; and
   securing access to the first data based, at least in part, on the access policy.

2. The method of claim 1 further comprising:
   based on receipt of a request to access the first data from a requesting device, identifying a location of the requesting device; and
   based on determining that the location of the requesting device satisfies the access policy, supplying the first data.

3. The method of claim 2 further comprising, based on determining that the location of the requesting device does not satisfy the access policy, responding to the request with a portion of the first data which is exempted from the access policy.

4. The method of claim 2 further comprising:
   associating a time period with at least one of the geographical areas in the access policy;
   wherein supplying the first data is also based on determining that the request was received within the associated time period.

5. The method of claim 1, wherein identifying the one or more geographical areas based, at least in part, on the category of the first data comprises determining typical usage locations corresponding to the category of the first data.

6. The method of claim 5, wherein the category of the first data is a protected health information; wherein at least one of the geographical areas corresponds to a location of medical personnel.

7. The method of claim 1 further comprising determining the current location of the first measuring device.

8. The method of claim 1, wherein determining the category of the first data comprises determining a type of the first measuring device.

9. The method of claim 1 further comprising:
   determining a security level for the first data based, at least in part, on the category of the first data; and
   determining a size of at least one of the geographical areas based, at least in part, on the security level, wherein the at least one geographical area is smaller if the security level indicates heightened security and larger if the security level indicates lower security.

10. One or more non-transitory machine-readable media having program code for providing geographically based access controls for data stored therein, the program code to:
    based on receiving first data from a first measuring device, determine a category of the first data;
    identify one or more geographical areas based, at least in part, on the category of the first data and a current location of the first measuring device;
    generate an access policy for the first data based, at least in part, on the identified geographical areas; and
    secure access to the first data based, at least in part, on the access policy.

11. The machine-readable media of claim 10 further comprising program code to:
    based on receipt of a request to access the first data from a requesting device, identify a location of the requesting device; and
    based on a determination that the location of the requesting device satisfies the access policy, supply the first data.

12. An apparatus comprising:
    a processor; and
    a non-transitory machine-readable medium having program code executable by the processor to cause the apparatus to,
        based on receiving first data from a first measuring device, determine a category of the first data;
        identify one or more geographical areas based, at least in part, on the category of the first data and a current location of the first measuring device;
        generate an access policy for the first data based, at least in part, on the identified geographical areas; and
        secure access to the first data based, at least in part, on the access policy.

13. The apparatus of claim 12 further comprising program code executable by the processor to cause the apparatus to:
    based on receipt of a request to access the first data from a requesting device, identify a location of the requesting device; and
    based on a determination that the location of the requesting device satisfies the access policy, supply the first data.

14. The apparatus of claim 13 further comprising program code executable by the processor to cause the apparatus to, based on a determination that the location of the requesting device does not satisfy the access policy, respond to the request with a portion of the first data which is exempted from the access policy.

15. The apparatus of claim 13 further comprising program code executable by the processor to cause the apparatus to:
    associate a time period with at least one of the geographical areas in the access policy;
    wherein the program code executable by the processor to cause the apparatus to supply the first data is also based on a determination that the request was received within the associated time period.

16. The apparatus of claim 12, wherein the program code executable by the processor to cause the apparatus to identify the one or more geographical areas based, at least in part, on the category of the first data comprises program code executable by the processor to cause the apparatus to determine typical usage locations corresponding to the category of the first data.

17. The apparatus of claim 16, wherein the category of the first data is a protected health information; wherein at least one of the geographical areas corresponds to a location of medical personnel.

18. The apparatus of claim 12 further comprising program code executable by the processor to cause the apparatus to determine the current location of the first measuring device.

19. The apparatus of claim 12, wherein the program code executable by the processor to cause the apparatus to determine the category of the first data comprises program code executable by the processor to cause the apparatus to determine a type of the first measuring device.

20. The apparatus of claim 12 further comprising program code executable by the processor to cause the apparatus to:
    determine a security level for the first data based, at least in part, on the category of the first data; and
    determine a size of at least one of the geographical areas based, at least in part, on the security level, wherein the at least one geographical area is smaller if the security level indicates heightened security and larger if the security level indicates lower security.

* * * * *